United States Patent
Heo et al.

(10) Patent No.: US 10,824,893 B2
(45) Date of Patent: Nov. 3, 2020

(54) METHOD OF EVALUATING PERFORMANCE OF BIO-SENSOR, AUTHENTICATION METHOD USING BIO-IMAGE, AND ELECTRONIC APPARATUS ADOPTING THE AUTHENTICATION METHOD

(71) Applicant: SAMSUNG ELECTRONICS CO., LTD., Suwon-si (KR)

(72) Inventors: Jingu Heo, Yongin-si (KR); Hyoseok Hwang, Suwon-si (KR); Byungkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 15/912,020

(22) Filed: Mar. 5, 2018

(65) Prior Publication Data
US 2019/0057270 A1    Feb. 21, 2019

(30) Foreign Application Priority Data

Aug. 16, 2017    (KR) .................. 10-2017-0103724

(51) Int. Cl.
| | | |
|---|---|---|
| G06K 9/03 | (2006.01) | |
| G06K 9/46 | (2006.01) | |
| G06F 17/18 | (2006.01) | |
| G06K 9/00 | (2006.01) | |
| G06F 21/32 | (2013.01) | |
| G06F 21/83 | (2013.01) | |

(52) U.S. Cl.
CPC ............. *G06K 9/036* (2013.01); *G06F 17/18* (2013.01); *G06F 21/32* (2013.01); *G06F 21/83* (2013.01); *G06K 9/00006* (2013.01); *G06K 9/0008* (2013.01); *G06K 9/00221* (2013.01); *G06K 9/00597* (2013.01); *G06K 9/46* (2013.01)

(58) Field of Classification Search
CPC .. G06K 9/036; G06K 9/00033; G06K 9/0008; G06K 9/00006; G06K 9/00221; G06K 9/00597; G06K 9/46; G06K 9/0002; G06K 9/00067; G06F 17/18; G06F 21/32; G06F 21/83
See application file for complete search history.

(56) References Cited

U.S. PATENT DOCUMENTS

| | | |
|---|---|---|
| 7,711,158 B2 | 5/2010 | Ahn et al. |
| 9,202,104 B2 | 12/2015 | Abe |

(Continued)

FOREIGN PATENT DOCUMENTS

| | | |
|---|---|---|
| JP | 5971089 B2 | 8/2016 |
| KR | 10-2005-0099220 A | 10/2005 |

(Continued)

*Primary Examiner* — Jianxun Yang
(74) *Attorney, Agent, or Firm* — Sughrue Mion, PLLC

(57) ABSTRACT

Provided is a method of evaluating performance of a bio-sensor. The method may include obtaining an input bio-image by using the bio-sensor that is to be evaluated; obtaining a sample database including information of M reference bio-images, where M is a natural number; and calculating a quality score of the input bio-image based on the input bio-image and the information in the sample database. The quality score may provide an objective and quantitative score for evaluating a bio-image.

21 Claims, 9 Drawing Sheets

(56) References Cited

U.S. PATENT DOCUMENTS

| | | | |
|---|---|---|---|
| 2003/0028784 A1* | 2/2003 | Uchida | G06K 9/00026 |
| | | | 713/186 |
| 2007/0047783 A1* | 3/2007 | Kim | G06K 9/00067 |
| | | | 382/124 |
| 2010/0046812 A1 | 2/2010 | Maurer et al. | |
| 2014/0226879 A1 | 8/2014 | Westerman et al. | |
| 2016/0063294 A1* | 3/2016 | Du | G06K 9/0002 |
| | | | 382/124 |
| 2016/0180142 A1* | 6/2016 | Riddle | G06K 9/00033 |
| | | | 382/124 |
| 2016/0241552 A1 | 8/2016 | Lindemann | |

FOREIGN PATENT DOCUMENTS

| | | |
|---|---|---|
| KR | 10-2006-0124964 A | 12/2006 |
| KR | 10-0923935 B1 | 10/2009 |

\* cited by examiner $$\begin{pmatrix} Gf\_1\_1, & Gf\_2\_1, & \cdots & Gf\_N\_1 \\ Gf\_1\_2, & Gf\_2\_2, & \cdots & Gf\_N\_2 \\ \vdots & \vdots & & \vdots \\ Gf\_1\_M, & Gf\_2\_M, & \cdots & Gf\_N\_M \end{pmatrix} \begin{pmatrix} w\_1 \\ w\_2 \\ \vdots \\ w\_N \end{pmatrix} = \begin{pmatrix} y\_1 \\ y\_2 \\ \vdots \\ y\_M \end{pmatrix}$$

METHOD OF EVALUATING PERFORMANCE OF BIO-SENSOR, AUTHENTICATION METHOD USING BIO-IMAGE, AND ELECTRONIC APPARATUS ADOPTING THE AUTHENTICATION METHOD

CROSS-REFERENCE TO RELATED APPLICATION

This application claims priority from Korean Patent Application No. 10-2017-0103724, filed on Aug. 16, 2017, in the Korean Intellectual Property Office, the disclosure of which is incorporated herein in its entirety by reference.

BACKGROUND

1. Field

The present disclosure relates to a method of estimating performance of a bio-sensor, an authentication method using a bio-image, and an electronic apparatus adopting the authentication method.

2. Description of the Related Art

There is an increasing necessity for personal authentication using a unique characteristic (e.g., biosignature) of a person, such as a fingerprint, a voice, a face, a hand, an iris, or the like. A personal authentication function is mainly used in financial apparatuses, access controllers, mobile devices, notebooks, or the like, and because mobile devices such as smartphones have spread widely, a sensor for personal authentication has been adopted in smartphones so as to protect personal and/or sensitive information stored in the smartphones.

The sensor for personal authentication may sense an input fingerprint image, may compare the input fingerprint image with a pre-registered fingerprint image, and may determine whether to authenticate the input fingerprint image. In this regard, it may be difficult or impossible to determine the authentication, depending on the quality of the input fingerprint image. Thus, there is a need for an objective standard with respect to determining at which degree of image quality the authentication is granted.

SUMMARY

Provided is a method of setting a quality score of a bio-image for authentication.

Provided is an authentication method using a bio-image.

Provided is an electronic apparatus adopting the authentication method.

Additional aspects will be set forth in part in the description which follows and, in part, will be apparent from the description, or may be learned by practice of the presented example embodiments.

According to an aspect of an example embodiment, a method of evaluating performance of a bio-sensor may include obtaining an input bio-image by using the bio-sensor that is to be evaluated; obtaining a sample database including information of M reference bio-images, where M is a natural number; and calculating a quality score of the input bio-image based on the input bio-image and the information of the M reference bio-images in the sample database.

The calculating of the quality score may include defining a plurality of features (N features $f\_1, f\_2, \ldots, f\_N$, where N is an integer greater than 1) to be expressed as predetermined values; calculating first values ($Gf\_i\_j$, where i indicates integers from 1 to N, and j indicates integers from 1 to M), the first values indicating the plurality of features with respect to the sample database; calculating second values ($If\_i$, where i indicates an integer from 1 to N), the second values indicating the plurality of features with respect to the input bio-image; and quantifying differences between the first values ($Gf\_i\_j$) and the second values ($If\_i$) by using a preset formula.

The defining of the plurality of features may include defining some of the plurality of features as $f\_i$ (where i indicates an integer from 1 to a) by applying a plurality of items (a items) for estimating an image to an entire target area of the image, where a is a natural number, and defining another some of the plurality of features as $f\_i'$ (where, i' indicates an integer from a+1 to a+b*a) by applying the plurality of items to each of b areas into which the target area of the image is divided.

The plurality of items may include at least one of a mean of brightness, a standard deviation of brightness, roundness of a bright line, uniformity of brightness, and inhomogeneity of brightness.

The quantifying may include calculating deviation values ($d\_i$), the deviation values indicating deviations of the second values ($If\_i$) with respect to the first values ($Gf\_i\_j$); calculating scores ($Fscore\_i$) of the plurality of features from the deviation values ($d\_i$); and applying weights ($w\_i$) to the scores ($Fscore\_i$), respectively, and performing a summing operation by using Formula $\Sigma^{N}_{i=1}(Fscore\_i * w\_i)$.

According to an aspect of an example embodiment, an authentication method may include obtaining an input bio-image input to an electronic apparatus; calculating a quality score of the input bio-image from the input bio-image and a sample database that includes information of M reference bio-images stored in the electronic apparatus, where M is a natural number; determining whether the quality score is greater than or equal to a threshold value; and performing a matching operation by determining whether the input bio-image matches a registered image stored in the electronic apparatus.

The calculating of the quality score may include defining a plurality of features (N features $f\_1, f\_2, \ldots, f\_N$, where N is an integer greater than 1) to be expressed as predetermined values; calculating first values ($Gf\_i\_j$, where i indicates an integer from 1 to N, and j indicates an integer from 1 to M), the first values indicating the plurality of features with respect to the sample database; calculating second values ($If\_i$, where i indicates an integer from 1 to N), the second values indicating the plurality of features with respect to the input bio-image; and quantifying differences between the first values ($Gf\_i\_j$) and the second values ($If\_i$) by using a preset formula.

The defining of the plurality of features may include defining some of the plurality of features as $f\_i$ (where, i indicates an integer from 1 to a) by applying a plurality of items (a items) for estimating an image to an entire target area of the image, and defining another some of the plurality of features as $f\_i'$ (where, i' indicates an integer from a+1 to a+b*a) by applying the plurality of items to each of b areas into which the target area of the entire image is divided.

The plurality of items may include at least one of a mean of brightness, a standard deviation of brightness, roundness of a bright line, uniformity of brightness, and inhomogeneity of brightness.

The he quantifying may include calculating deviation values ($d\_i$), the deviation values indicating deviations of the second values (If_i) with respect to the first values (Gf_i_j); calculating scores (Fscore_i) of the plurality of features from the deviation values (d_i); and applying weights (w_i) to the scores (Fscore_i), respectively, and performing a summing operation by using Formula $\Sigma^{N}_{i=1}$ (Fscore_i*w_i).

The authentication method may further include, if the quality score is greater than or equal to the threshold value, and the matching operation is determined as a matching failure, adjusting at least one of the weights.

The authentication method may further include, if the quality score is less than the threshold value, and the matching operation is determined as a matching success, adjusting at least one of the weights.

The authentication method may further include, if the quality score is less than the threshold value, performing image processing for enhancing quality of the input bio-image.

The authentication method may further include displaying the input bio-image and the quality score on a display of the electronic apparatus.

According to an aspect of an example embodiment, an electronic apparatus includes a bio-sensor configured to sense an input bio-image; a memory configured to store a sample database, the sample database including information of M reference bio-images, a registered bio-image of a user, and at least one program, where M is a natural number; and a processor configured to, by executing the at least one program, calculate a quality score of the input bio-image from the sample database and the input bio-image, determine whether the quality score is greater than or equal to a threshold value, and determine whether the input bio-image matches the registered bio-image.

The electronic apparatus may further include a display configured to display the input bio-image and the quality score.

The bio-sensor may be one of a fingerprint recognition sensor, an iris recognition sensor, a blood vessel recognition sensor, and a face recognition sensor.

If the quality score is less than the threshold value, the processor may be further configured to perform image processing for enhancing quality of the input bio-image.

If the quality score is greater than or equal to the threshold value and the processor determines that the input bio-image does not match the registered bio-image, the processor may be further configured to store a result in the memory so as to feed the result back to the at least one program for calculating the quality score.

If the quality score is less than the threshold value and the processor determines that the input bio-image matches the registered bio-image, the processor may be further configured to store a result in the memory so as to feed the result back to the at least one program for calculating the quality score.

BRIEF DESCRIPTION OF THE DRAWINGS

These and/or other aspects will become apparent and more readily appreciated from the following description of the embodiments, taken in conjunction with the accompanying drawings in which.

Figure 1:
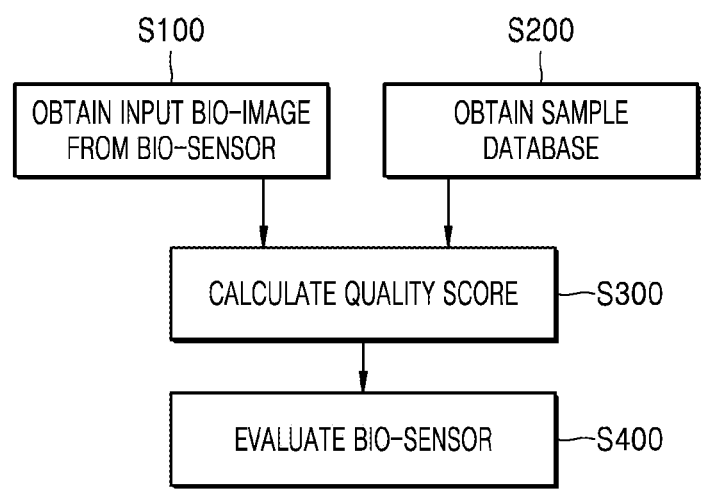
FIG. 1 is a flowchart for describing a method of evaluating performance of a bio-sensor, according to an example embodiment.

DETAILED DESCRIPTION will now be described more fully with reference to the accompanying drawings, in which example embodiments of the present disclosure are shown. In the drawings, like reference numerals in the drawings denote like elements, and the size of each component may be exaggerated for clarity and convenience of description. In this regard, the example embodiments may have different forms and should not be construed as being limited to the descriptions set forth herein.

Throughout the specification, it will also be understood that when an element is referred to as being "on" another element, it can be directly on the other element, or intervening elements may also be present therebetween.

While terms "first" and "second" are used to describe various components, the components are not limited to the terms "first" and "second". The terms "first" and "second" are used only to distinguish between each of components, and not to imply order, preference, or relative significance.

Throughout the specification, a singular form may include plural forms, unless there is a particular description contrary thereto. Also, when a part "includes" or "comprises" an element, unless there is a particular description contrary thereto, the part can further include other elements, not excluding the other elements.

Throughout the specification, terms such as "unit," "module," or the like indicate a unit for processing at least one function or operation, wherein the unit and the module may be embodied as hardware (e.g., circuit, microchip, processor, etc.), software (e.g., application program, firmware, etc.), or a combination of both hardware and software.

As used herein, the term "and/or" includes any and all combinations of one or more of the associated listed items. Expressions such as "at least one of," when preceding a list of elements, modify the entire list of elements and do not modify the individual elements of the list.

FIG. 1 is a flowchart for describing a method of evaluating performance of a bio-sensor, according to an example embodiment.

The method of evaluating performance of a bio-sensor includes obtaining, by using a bio-sensor, an input bio-image that is to be evaluated (S100), and calculating a quality score of the input bio-image (S300). The quality score may be a reference score to evaluate the bio-sensor, i.e., performance of the bio-sensor may be determined based on the calculated quality score (S400).

The bio-sensor that is to be estimated is a device for detecting an image of bio-object indicating a unique difference between humans, and may convert information of the bio-object into an electrical signal. A bio-image may be one of a fingerprint image, an iris image, a blood vessel image, and a face image. The bio-sensor may vary depending on a type of the bio-image to be detected, and may be one of a fingerprint recognition sensor, an iris recognition sensor, a blood vessel recognition sensor, and a face recognition sensor.

In the present example embodiment, the quality score is proposed as a reference score by which quality of an image has a predetermined relation with a recognition rate of a sensor. In order to calculate the quality score, an operation of obtaining a sample database is performed (S200). The sample database may include information of M reference bio-images, in which groups of sample images of generally good quality are present, where M is a natural number.

Figure 2:
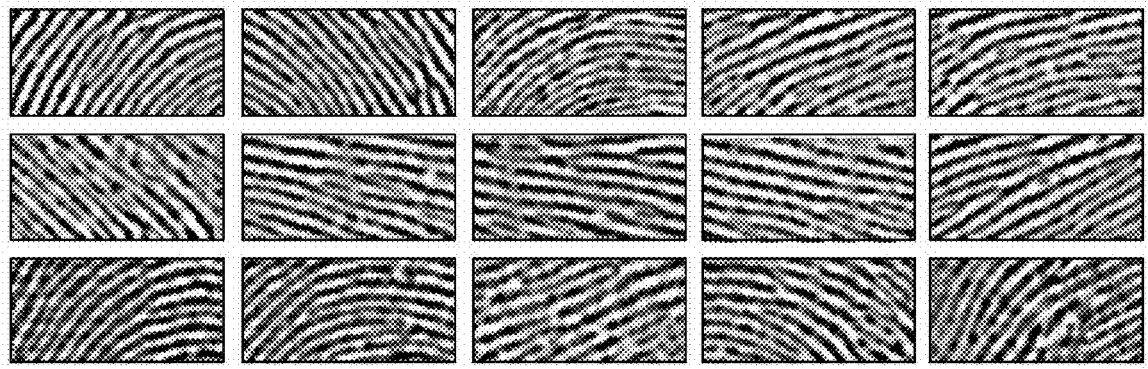
FIG. 2 illustrates an example of a sample database used in the flowchart of FIG. 1.

FIG. 2 illustrates an example of the sample database used in the flowchart of FIG. 1.

The sample images included in the sample database are the same type as a type of the bio-image obtained by the bio-sensor. The sample images may be collected from a plurality of users, and images having a good quality from among collected images may be selected for the sample database. FIG. 2 illustrates fingerprints images as a plurality of bio-images, which are easily distinguishable to the naked eye.

Hereinafter, descriptions are provided assuming that a bio-image is a fingerprint image, but the bio-image is not limited thereto. The number of the bio-images is exemplary, and several hundreds, several thousands, or more of the bio-images may be present. Hereinafter, the number of sample images that are included in the sample database is assumed to be M (where, M is a natural number).

Figure 3:
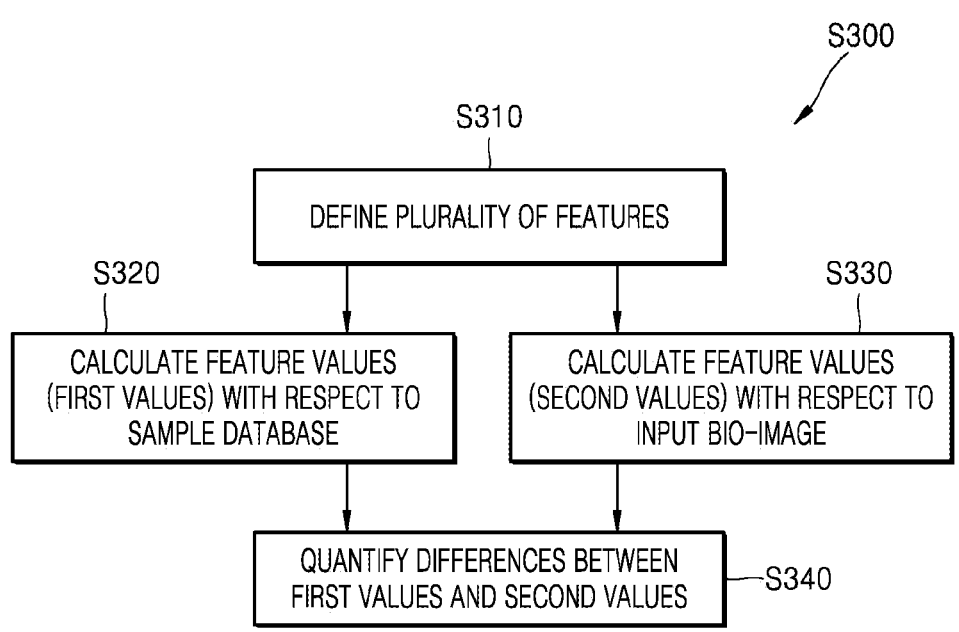
FIG. 3 is a flowchart describing in detail a process of calculating a quality score in the flowchart of FIG. 1.
Figure 4:
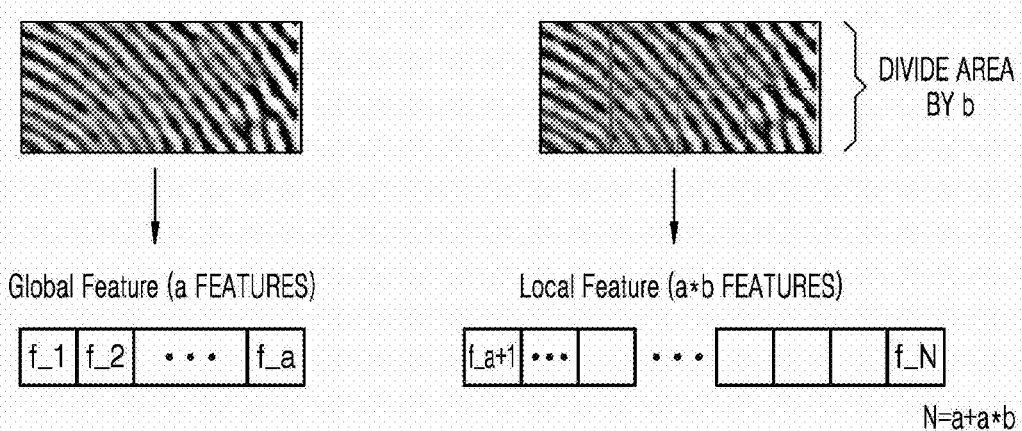
FIG. 4 is a conceptual diagram illustrating a plurality of features, defined with respect to a bio-image, in the flowchart of FIG. 3.
Figure 5:
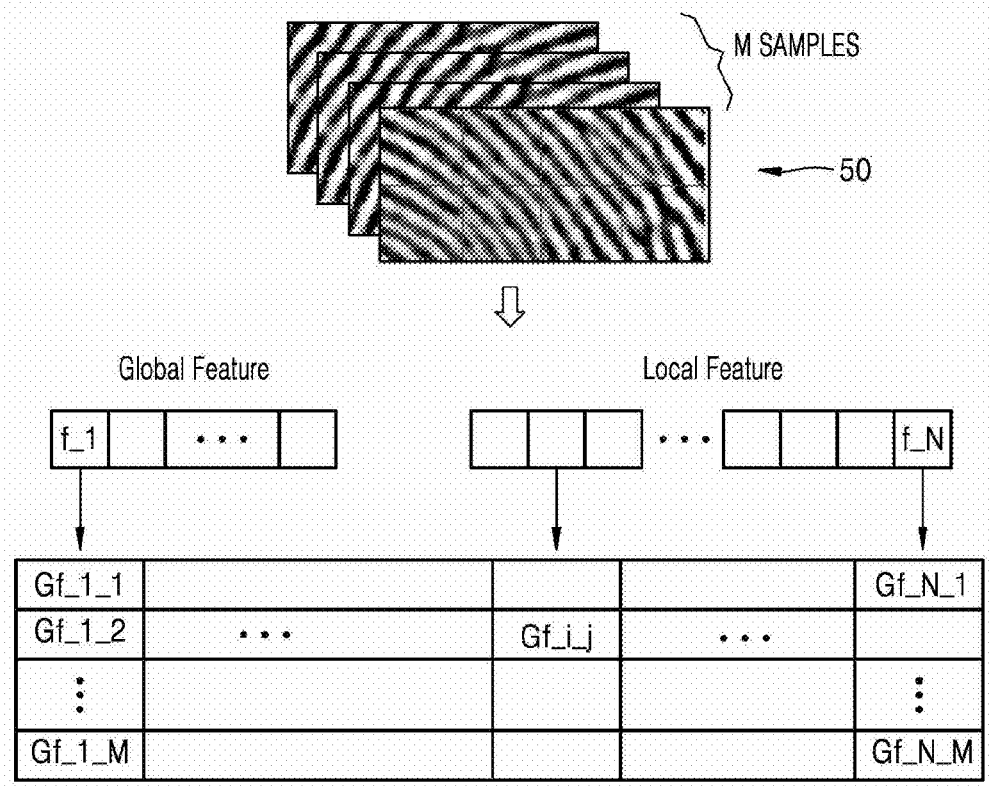
FIG. 5 is a conceptual diagram illustrating a process of calculating feature values with respect to the sample database, in the flowchart of FIG. 3.
Figure 6:
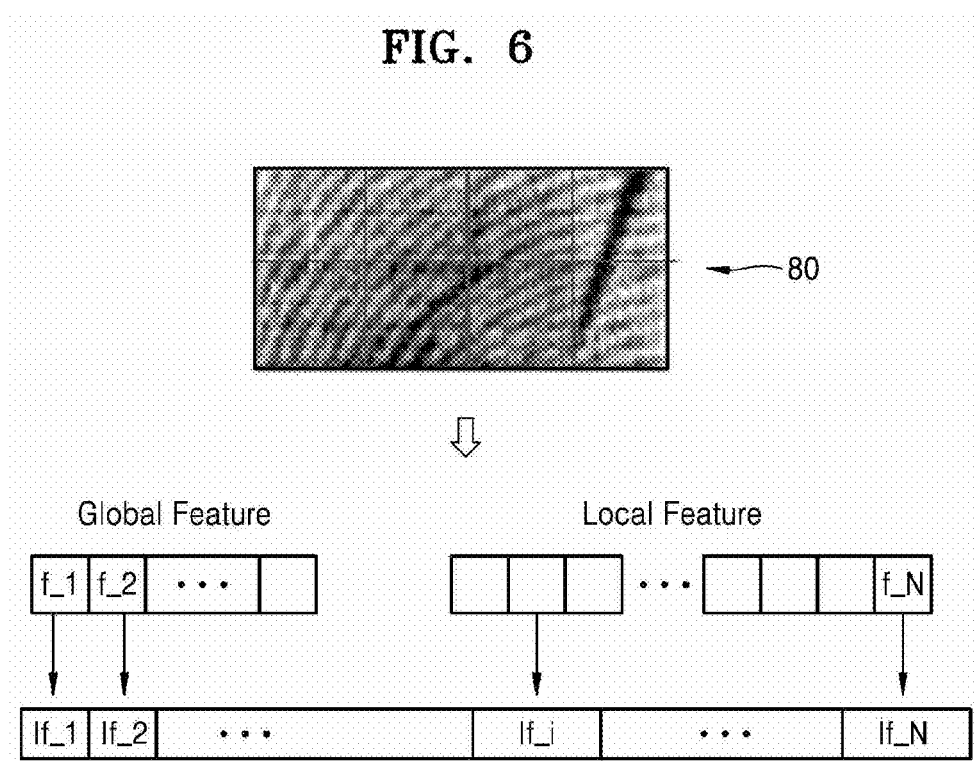
FIG. 6 is a conceptual diagram illustrating a process of calculating feature values with respect to an input bio-image, in the flowchart of FIG. 3.

FIG. 3 is a flowchart illustrating in detail the calculating of a quality score (S300) in the flowchart of FIG. 1. FIG. 4 is a conceptual diagram illustrating a plurality of features defined with respect to a bio-image, in the flowchart of FIG. 3. FIG. 5 is a conceptual diagram illustrating a process of calculating feature values with respect to the sample database, in the flowchart of FIG. 3. FIG. 6 is a conceptual diagram illustrating a process of calculating feature values with respect to an input bio-image, in the flowchart of FIG. 3.

Referring to FIG. 3, the calculating of a quality score (S300) includes defining a plurality of features to be extracted with respect to the bio-image (S310), calculating feature values (hereinafter, referred to as first values) related to the plurality of defined features with respect to the sample database (S320), calculating feature values (hereinafter, referred to as second values) related to the plurality of defined features with respect to the input bio-image (S330), and quantifying differences between the first values and the second values (S340).

In the defining of a plurality of features (S310), the plurality of features to be extracted with respect to the bio-image may be related to items such as a mean of brightness, a standard deviation of brightness, roundness of a bright line, uniformity of brightness, inhomogeneity of brightness, or the like.

The mean of brightness (m) may be defined as below.

$$m = \sum_{i=0}^{L-1} I_i h(I_i)$$

$I_i$ indicates a value by which brightness at a location i is expressed as intensity, and $h(I_i)$ indicates a frequency number related to $I_i$.

The standard deviation of brightness ($\sigma$) may be defined as below.

$$\sigma = \sqrt{\sum_{i=0}^{L-1} (I_i - m)^2 h(I_i)}$$

Roundness (R) indicating roundness of a bright line may be defined as below.

$$R = 1 - \frac{1}{1 + \sigma^2}$$

U indicating the uniformity of brightness may be defined as below.

$$U = \sum_{i=0}^{L-1} h(I_i)$$

inH indicating the inhomogeneity of brightness may be defined as below.

$$inH = \frac{m \times U}{\sigma \times R}$$

The aforementioned five items are merely exemplary. All of the five items may be extracted with respect to the bio-image, some items of the five items may be extracted with respect to the bio-image, or another feature related to quality may be extracted. For example, noise, an artifact, a brightness deviation in areas, or the like may be used as items related to features of the bio-image.

Referring to FIG. 4, N (where, N is a natural number) features (f_1, f_2, . . . , f_N) to be expressed as predetermined values are defined. The N features may include a global feature to be applied to an entire target area, and a local feature to be applied to areas split from the target area, wherein the global feature and the local feature are related to the items such as the mean of brightness, the standard deviation of brightness, the roundness of a bright line, the uniformity of brightness, the inhomogeneity of brightness, or the like.

That is, the N features may be defined as f_i (where, i indicates an integer from 1 to a) by applying a items for estimating a target image to all of the target image, and f_i (where, i indicates an integer from a+1 to a+b*a, where a and b are natural numbers) by applying the a items to each of b areas into which the target image is divided. For example, when the number of the items, a, is 5, and the number of the divided areas with respect to the target image, b is 8, the global feature may be 5, i.e., from f_1 to f_5, and the local feature may be 40, i.e., from f_6 to f_45. The total number the extracted N features is 45.

With reference to FIG. 5, the calculating of feature values related to the plurality of defined features with respect to the sample database (S320) will now be described.

A sample database 50 may include M bio-image samples. Features related to the global feature and the local feature may be extracted with respect to each of the M bio-image samples, and may correspond to values of f_i (where, i indicates an integer from 1 to a) related to the global feature, and values of f_i (where, i indicates an integer from a+1 to a+b*a) related to the local feature. The feature values extracted with respect to the sample database 50 are referred to as the first values. The first values may indicate N feature values respectively extracted with respect to M sample images and may be expressed in an M×N table. An $i_{th}$ feature value extracted with respect to a $j_{th}$ sample image is Gf_i_j (where, i indicates an integer from 1 to N, and j indicates an integer from 1 to M).

With reference to FIG. 6, the calculating of feature values, the feature values related to the plurality of defined features (S330) with respect to an input bio-image 80, will now be described.

The feature values defined with reference to FIG. 4, i.e., features related to the global feature and the local feature may be extracted with respect to the input bio-image 80, and may correspond to values of f_i (where, i indicates an integer from 1 to N). Hereinafter, the feature values extracted with respect to the input bio-image 80 are referred to as the second values.

The second values may be expressed in a 1×N table. An $i_{th}$ feature value is expressed as If_i (where, i indicates an integer from 1 to N).

Figure 7:
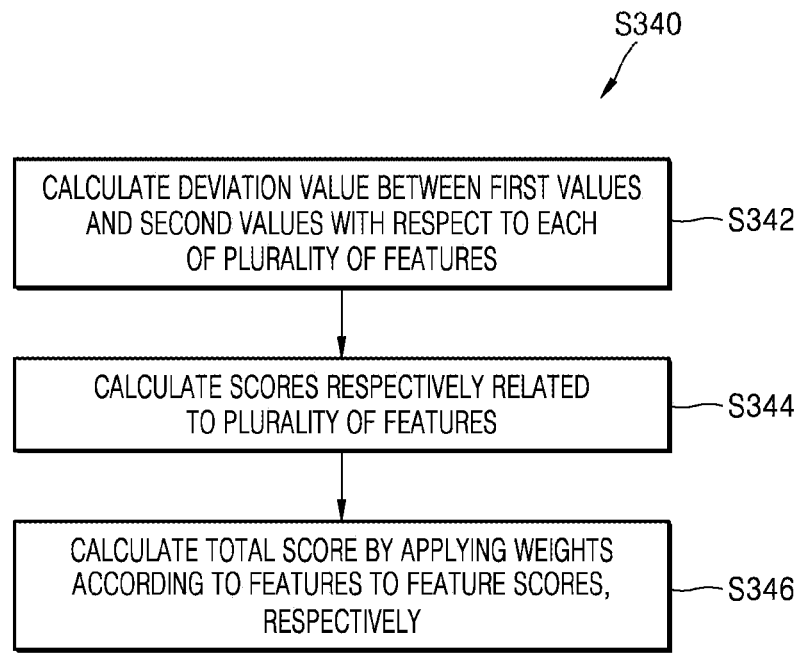
FIG. 7 is a flowchart describing in detail a process of quantifying differences between feature values with respect to the sample database and feature values with respect to the input bio-image in the flowchart of FIG. 3.
Figure 8:
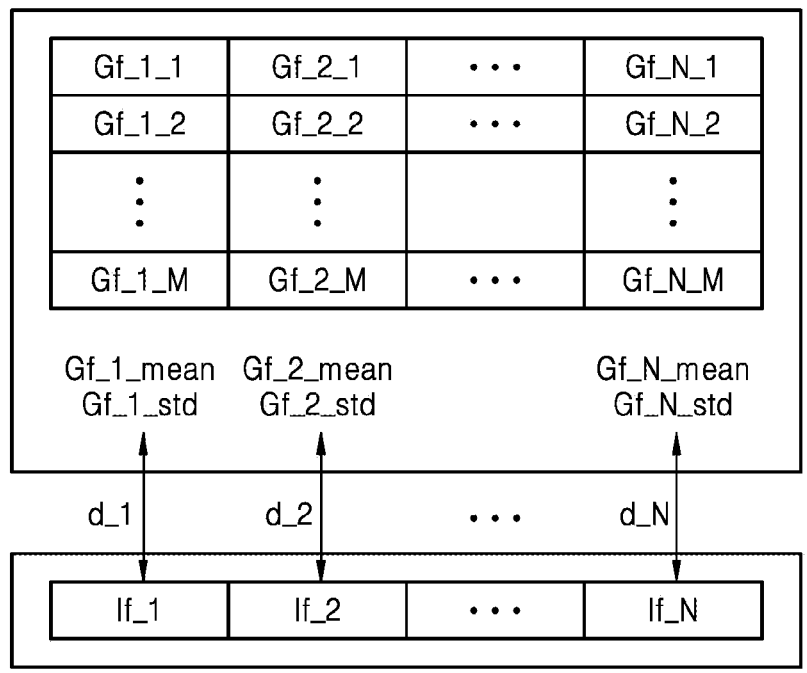
FIG. 8 is a conceptual diagram for describing deviation values defined between the feature values with respect to the sample database and the feature values with respect to the input bio-image in the flowchart of FIG. 7.

FIG. 7 is a flowchart describing in detail the quantifying of differences between the feature values with respect to the sample database and the feature values with respect to the input bio-image (S340), in the flowchart of FIG. 3. FIG. 8 is a conceptual diagram for describing deviation values defined between the feature values with respect to the sample database and the feature values with respect to the input bio-image, in the flowchart of FIG. 7.

Referring to FIG. 7, in the quantifying of a difference between the feature values with respect to the sample database and the feature values with respect to the input bio-image (S340), first, a deviation value between the first values and the second values is calculated with respect to each of the plurality of features (S342).

The deviation values are calculated so as to correspond to the number of the N features. As illustrated in FIG. 8, deviation values d_i are defined by a relation between values of an i column in the M×N table indicating the first values (Gf_i_j) and values of an i column in the 1×N table indicating the second values (If_i). In this regard, a mean and a standard deviation of the values (i.e., Gf_i_1, Gf_i_2 . . . , Gf_i_M) of the i column are used.

The deviation values d_i (where, i indicates an integer from 1 to N) between the first values (Gf_i_j) and the second values (If_i) may be defined as below.

$$d\_i = If\_i - (Gf\_i\_mean / Gf\_i\_std)$$

where, Gf_i_mean and Gf_i_std respectively indicate a mean and a standard deviation of $i_{th}$ feature values extracted with respect to different sample images, i.e., Gf_i_mean and Gf_i_std respectively indicate a mean and a standard deviation of Gf_i_j (where, j indicates an integer from 1 to M).

After the deviation values d_i are calculated, scores that are respectively related to the plurality of features are calculated therefrom (S344). Each feature score is defined as below.

$$Fscore\_i = (d\_i - d\_i\_min) / (d\_i\_max - d\_i\_min)$$

where, d_i_min and d_i_max indicate a minimum value and a maximum value, respectively, of d_i values. The values may be preset as a minimum value and a maximum value of a deviation values related to features f_i between the sample database and the input bio-image. For example, the minimum value and the maximum value of the d_i values may be previously calculated from various sets with respect to the sample database and the input bio-image. According to the formula, Fscore is normalized to have a value between 0 and 1, inclusive.

After feature scores (Fscore_i) are each calculated, weights w_i according to features are applied to the feature scores, so that a total score is calculated (S346). The total score indicates a quality score (Fscore_total) and is defined as below.

$$Fscore\_total = \sum_{i=1}^{N} (Fscore\_i * w\_i)$$

The weights w_i indicate importance of the features that contribute the quality score, and values of the weights w_i may be preset so that a total sum of the weights w_i may be 1.

The quality score estimated based on the score calculation standard may be used in estimating the bio-sensor that obtained a target bio-image. The quality score may be used in determining whether the bio-sensor accurately senses the bio-image, i.e., because it is possible to estimate accuracy or sensitivity of the bio-sensor, a method of calculating the quality score may be adopted to develop a bio-sensor having excellent performance.

The quality score may also be used in the authentication method and may be applied to an electronic apparatus. When the quality score is applied to the electronic apparatus that performs authentication, the quality score has a high correlation with an authentication rate. This will be described below. Accordingly, the quality score may be used in various applications for increasing a rate of successful authentication.

Figure 9:
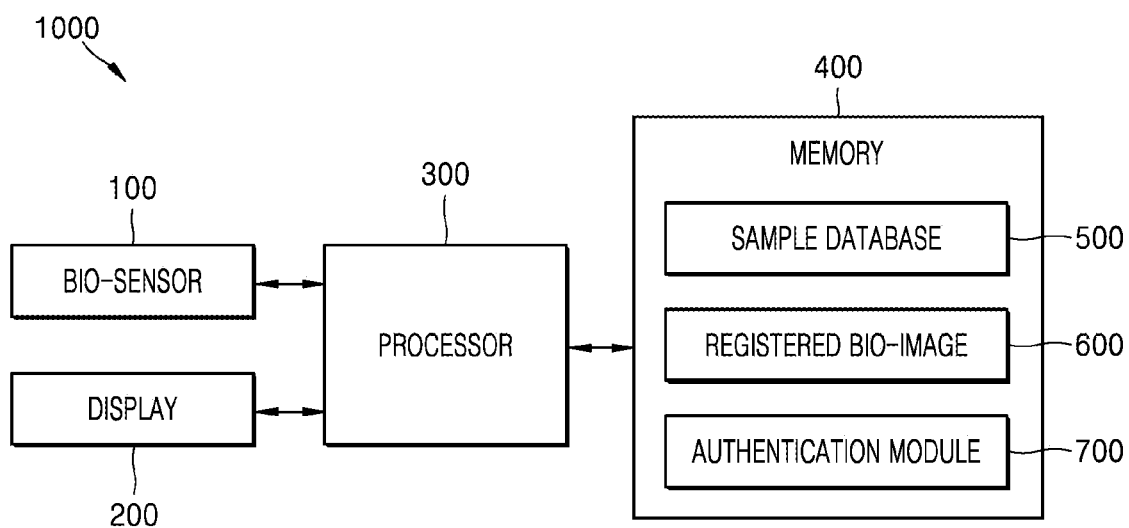
FIG. 9 is a block diagram illustrating a schematic configuration of an electronic apparatus, according to an example embodiment.
Figure 10:
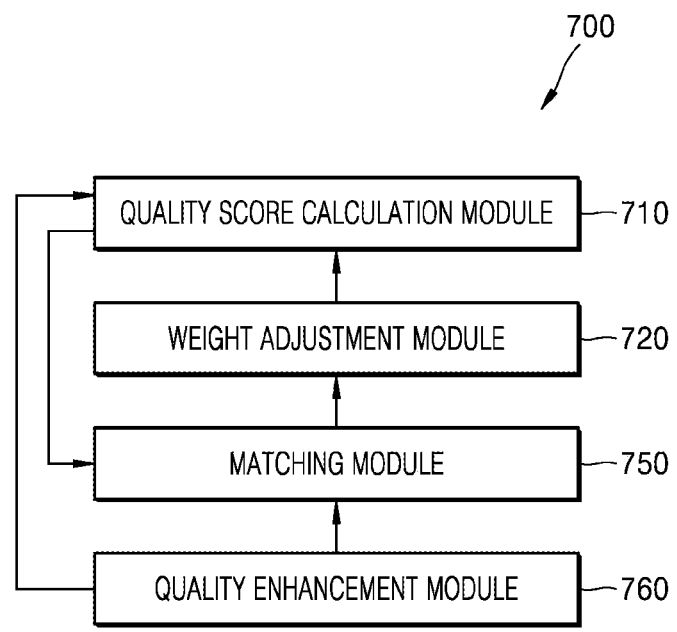
FIG. 10 is a block diagram illustrating a configuration of an authentication module in the electronic apparatus of FIG. 9.

FIG. 9 is a block diagram illustrating a schematic configuration of an electronic apparatus 1000, according to an example embodiment. FIG. 10 is a block diagram illustrating a configuration of an authentication module 700 in the electronic apparatus 1000 of FIG. 9.

The electronic apparatus 1000 includes a bio-sensor 100, a memory 400, and a processor 300.

The bio-sensor 100 is a sensor configured to sense an input bio-image, and may be one of a fingerprint recognition sensor, an iris recognition sensor, a blood vessel recognition sensor, and a face recognition sensor.

When the bio-image is a fingerprint image, the fingerprint recognition sensor may obtain an image of a fingerprint of a finger onto a sensing area. The fingerprint recognition sensor may detect the fingerprint image in an optical manner, a semiconductive manner, an ultrasound manner, a non-contact manner, or the like.

An optical-type fingerprint sensor may include a prism, a luminous source, a lens a charge-coupled device (CCD), or the like. In the optical-type fingerprint sensor, when a fingerprint is contacted onto the prism, the luminous source may emit light to the prism, the lens may collect light reflected through the prism, and the CCD may detect the collected light as a bio-image.

A semiconductive-type fingerprint sensor may include a thermal sensor, a capacitive sensor, an electric sensor, or the like.

The thermal sensor obtains, as a bio-image, a temperature distribution due to a difference between a temperature of a fingerprint contact area and a temperature of a non-contact area. The capacitive sensor obtains, as a bio-image, a difference between capacitances of ridges of a contact fingerprint, or a difference between a quantity of charges charged between the ridges. The electric sensor detects a bio-image from a fingerprint contacting onto the sensor or from an electric field generated around the fingerprint.

The fingerprint recognition sensor may include a plurality of pixels that are matrix-aligned. Each pixel generates a pixel value, e.g., a brightness value, which corresponds to a feature of a fingerprint, and a resolution of a fingerprint image may be determined based on the number of pixels.

When a bio-image is an iris image, the iris recognition sensor may obtain an image of an iris positioned at a sensing area. The iris recognition sensor may obtain an iris image by detecting light, e.g., infrared light, reflected from an eyeball including the iris.

In addition, the bio-sensor 100 appropriate for a target bio-image may be arranged at the electronic apparatus 1000.

The bio-sensor 100 may be placed to be exposed at one side of a housing of the electronic apparatus 1000.

The memory 400 may store one or more execution programs. For example, the memory 400 may store the authentication module 700 that includes instructions for performing a predetermined authentication process on an input bio-image obtained by the bio-sensor 100. In addition, the memory 400 may store data required to perform the authentication process, the data including a sample database 500 including information of a plurality of reference bio-images, and a registered bio-image 600 of a user. The memory 400 may store a module configured for process and control of the processor 300, and a module for various applications to be performed in the electronic apparatus 1000.

The memory 400 may include a storage medium of at least one type of a flash memory, a hard disk, a multimedia card micro-type memory, a card-type memory such as a secure digital (SD) or xD card memory, random access memory (RAM), static random access memory (SRAM), read-only memory (ROM), electrically erasable programmable read-only memory (EEPROM), programmable read-only memory (PROM), a magnetic memory, a magnetic disc, and an optical disc.

The processor 300 may drive an operating system and an application program, thereby controlling a plurality of elements connected to the processor 300 and managing processing and controlling with respect to the electronic apparatus 1000. The processor 300 may execute the program stored in the memory 400, thereby performing the authentication process on the input bio-image from the sample database 500 and the registered bio-image 600. The processor 300 may perform a series of processes for the registered bio-image 600. For example, when bio-information is registered, the processor 300 may perform various processes for an obtained bio-image, e.g., may convert the bio-image to a particular image by performing a process of converting a grayscale value to a black or white value, or may encrypt the bio-image. In order to use the registered bio-image 600 in comparison with a bio-image to be input at a later time, the processor 300 may store the registered bio-image 600 as an authentication template in a secured area of the memory 400.

The electronic apparatus 1000 may further include a display 200 on which the input bio-image obtained by the bio-sensor 100 and a quality score calculated by the processor 300 are displayed. The display 200 is controlled by the processor 300, and may provide an execution screen of a module, e.g., the authentication module 700, performed by the processor 300. The display 200 may be, but is not limited to, an organic light-emitting display panel or a liquid crystal display panel.

Referring to FIG. 10, the authentication module 700 may include a quality score calculation module 710 and a matching module 750. Various modules, units, components, etc. shown in FIG. 10 and other figures may be implemented by software, hardware (e.g., circuits, microchips, processors, etc.), or a combination of both. The authentication module 700 may further include a weight adjustment module 720 configured to adjust weights used in the quality score calculation module 710, and may further include a quality enhancement module 760 configured to enhance an image quality.

The quality score calculation module 710 calculates a quality score of an input bio-image by taking into account the sample database 500. The quality score is the same as described above with reference to FIGS. 3 through 8. That is, the quality score calculation module 710 may quantify a plurality of preset features with respect to the sample database 500 and the input bio-image, and may calculate scores obtained by quantifying differences therebetween.

The weight adjustment module 720 may set or adjust weights that are values of importance of features used in calculating the quality score. A matching result from the matching module 750 may be applied to the adjustment of weights. The adjusted weights may be used by the quality score calculation module 710. This will be described below with reference to FIGS. 11 and 12.

The matching module 750 determines whether the calculated quality score satisfies a predetermined condition, and determines whether the input bio-image matches the registered bio-image 600.

The matching module 750 may determine the match by comparing the input bio-image matches the registered bio-image 600. For example, the matching module 750 may determine a similarity by comparing the input bio-image matches the registered bio-image 600. If the similarity is greater than or equal to a threshold value, the matching module 750 may determine the match as a matching success, and if the similarity is less than the threshold value, the matching module 750 may determine the match as a matching failure. The threshold value may be predefined as a value for determining a match between the input bio-image and the registered bio-image 600.

The matching result may be stored in the memory 400. For example, if the calculated quality score is greater than or equal to a threshold value, and a matching result thereof is determined as a matching failure, the matching result is fed back to the weight adjustment module 720 such that the weights may be adjusted. Alternatively, if the calculated quality score is less than the threshold value, and a matching result thereof is determined as a matching success, the matching result is fed back to the weight adjustment module 720 such that the weights may be adjusted.

The quality enhancement module 760 may perform image processing for enhancing a quality of an input bio-image when the quality of the input bio-image is less than a predetermined threshold value. The image processing for enhancing a quality may indicate image processing for increasing a quality score calculated by the quality score calculation module 710. Because the quality score used in the present example embodiment is related to visual features of an image, the quality enhancement module 760 may increase the quality score by using a general image processing method for enhancing an image quality. The quality enhancement module 760 may be configured to select an appropriate image quality enhancing algorithm by taking into account the estimated quality score. For example, the estimated quality score and an image quality enhancing algorithm corresponding to the estimated quality score may be predefined in an algorithm table.

A result by the quality enhancement module 760, i.e., the input bio-image of which quality has been enhanced, may be delivered to the quality score calculation module 710.

Figure 11:
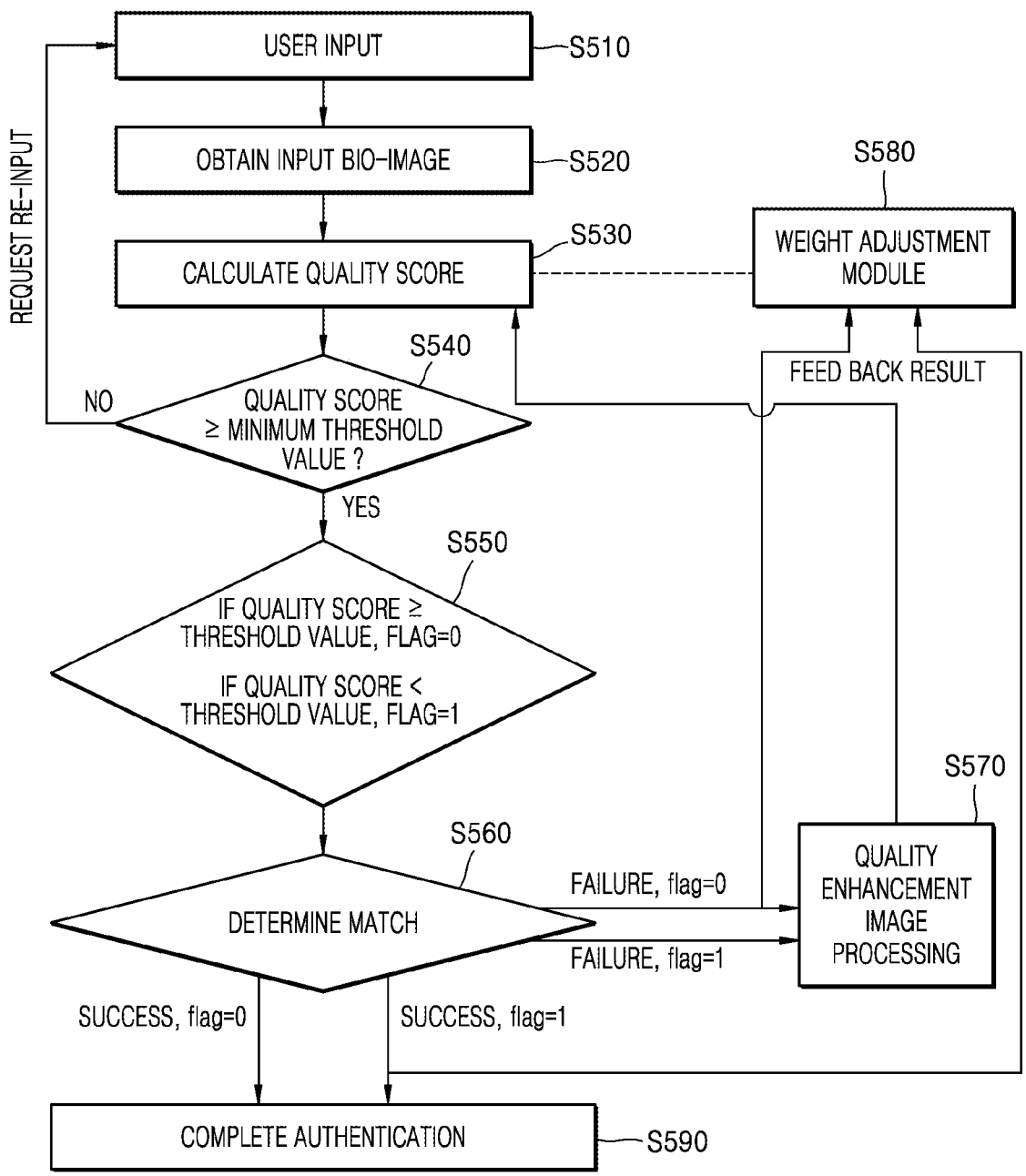
FIG. 11 is a flowchart for describing an authentication method performed by the electronic apparatus of FIG. 9.
Figures 12, 13:
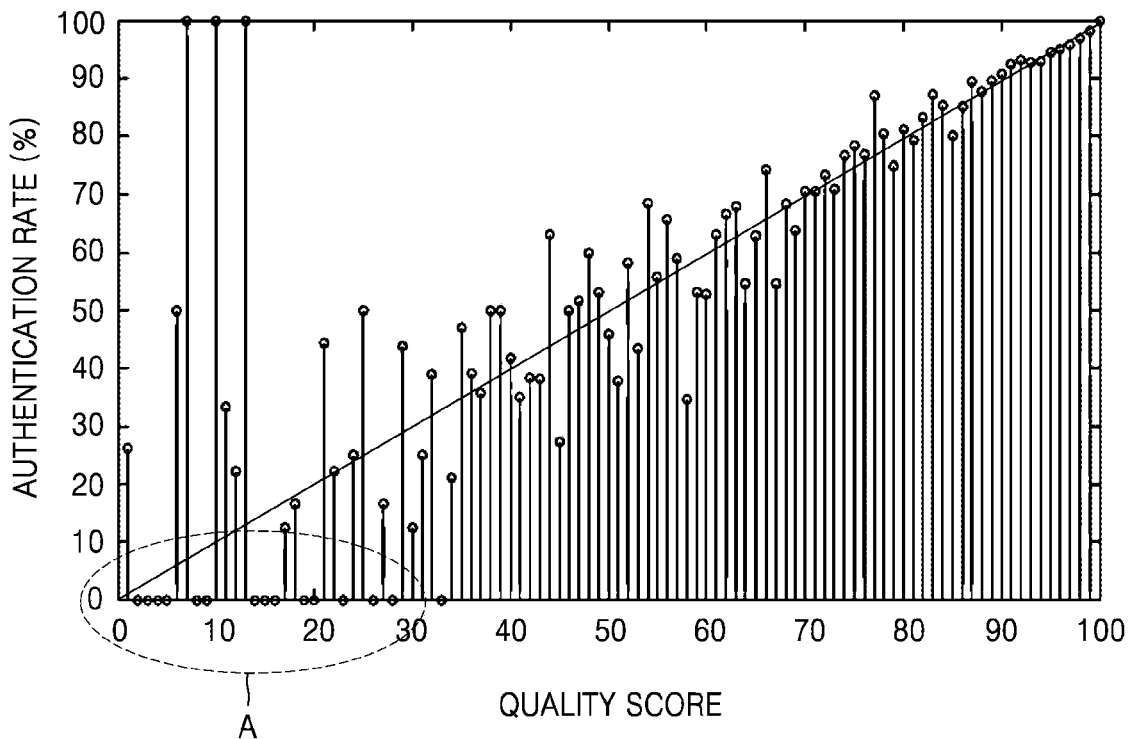
FIG. 12 illustrates an example of matrix equation that may be used in determining weights to be used in calculating a quality score when the electronic apparatus of FIG. 9 performs the authentication method.
FIG. 13 is a graph showing a relation between quality scores of an input bio-image and an authentication rate when the electronic apparatus of FIG. 9 performs the authentication method.

FIG. 11 is a flowchart for describing an authentication method performed by the electronic apparatus 1000 of FIG. 9. FIG. 12 illustrates an example of matrix equation that may be used in determining weights to be used in calculating a quality score when the electronic apparatus 1000 of FIG. 9 performs the authentication method.

According to the authentication method, first, a user input is received (S510), and then the bio-sensor 100 arranged in the electronic apparatus 1000 obtains an input bio-image (S520).

Afterward, the authentication method includes calculating a quality score of the input bio-image (S530).

The authentication method may include determining whether the calculated quality score is greater than or equal to a minimum threshold value (S540), and if the calculated quality score is less than the minimum threshold value, the authentication method may include requesting a user for a re-input. In this process, the calculated quality score may be displayed on the display 200 of the electronic apparatus 1000. In addition, the calculated quality score and the input bio-image may be displayed together on the display 200. Accordingly, since the user of the electronic apparatus 1000 repeatedly uses the electronic apparatus 1000, the electronic apparatus 1000 may predict an authentication rate with respect to the input bio-image, and may determine whether a re-input is required.

The determining of whether the calculated quality score is greater than or equal to a minimum threshold value (S540) may be skipped if required.

Afterward, the authentication method includes determining if the calculated quality score is greater than or equal to a threshold value (S550). As a result of the determining, if the calculated quality score is greater than or equal to the threshold value, a flag value may be set as 0, and if the calculated quality score is less than the threshold value, the flag value may be set as 1.

Next, the authentication method includes determining if the input bio-image matches a registered bio-image (S560). A result of determining whether the images match is determined as a matching success or a matching failure.

If the result corresponds to the matching failure, the authentication method includes performing quality enhancement image processing (S570). In a case of the matching failure, if the flag value is 0, i.e., in a case where the quality score is greater than or equal to the threshold value and it is determined as the matching failure, the authentication method may include feeding back a result thereof to the weight adjustment module 720 (S580). Because the quality score is presented to be a reference with which a match is determined to be successful or failed in a relation with a preset threshold value, if the quality score is inconsistent with the match, for example, when the quality score that is predicted to be a matching success is determined to be a matching failure, a weight value is adjusted so that an appropriate quality score may be calculated.

The quality enhancement image processing (S570) indicates image processing for increasing the quality score, and after the quality enhancement image processing is performed, the calculating of the quality score (S530) and processes related thereto are performed.

When the match is successful, authentication is ended (S590). In a case of the matching success, if the flag value is 1, i.e., in a case where the quality score is determined to be less than the threshold value and it is determined as the matching success, the authentication method may include feeding back a result thereof to the weight adjustment module 720 (S580).

Because the quality score is used as a reference with which a match is determined to be successful or failed in a relation with a preset threshold value, if the quality score is inconsistent with the match, for example, when the quality score that is predicted to be a matching failure is determined to be a matching success, a weight value is adjusted so that an appropriate quality score may be calculated.

Referring to FIG. 12, a matrix of M×1 indicating y_j (where, j indicates an integer from 1 to M) may be defined, wherein the matrix of M×1 is obtained by multiplying a matrix of M×N indicating first values (Gf_i_i) with respect to a plurality of features extracted with respect to a sample database by a matrix of N×1 indicating weights (w_i, where i indicates an integer from 1 to N).

When the matrix of M×N indicating the first values (Gf_i_i), the matrix of N×1 indicating weights (w_i, where i indicates an integer from 1 to N), and the matrix of M×1 indicating y_j (where, j indicates an integer from 1 to M) are expressed as D, w, and y, respectively, w satisfies the formula below.

$$w=(D^T D)^{-1} D^T y$$

The weights (w_i, where i indicates an integer from 1 to N) also satisfy a condition below.

$$\sum_{i=1}^{N} w\_i = 1$$

The weights are values to which importance of the features is applied. Thus, the values may be set by analyzing and learning a sample database, an input bio-image, a quality score, and a matching result, and may be continually updated. To do so, initial values of y that make a total sum of the weights (w_i) be 1 may be set, for example, the initial values of y may be all set 1. However, the present disclosure is not limited thereto.

FIG. 13 is a graph showing a relation between quality scores of an input bio-image and an authentication rate when the electronic apparatus 1000 of FIG. 9 performs the authentication method.

The quality scores and the authentication rate generally have a linear relation. A portion marked A is a region in which the linear relation is not clear. The region is positioned at a part of the graph in which quality scores are relatively low, and because the number of samples having low quality scores is small compared to other regions, a meaningful result is hardly obtained.

When the quality scores and the authentication rate have the linear relation, the authentication rate may be predicted based on only a quality of the input bio-image, and may be increased by using a general algorithm for enhancing the quality.

The electronic apparatus 1000 adopting the authentication method may be an independent apparatus that obtains a bio-image and performs authentication, or may be an apparatus including other functions. For example, the electronic apparatus 1000 may include, but is not limited to, a portable mobile communication device, a smartphone, a smart watch, a desktop computer, a laptop computer, a tablet personal computer (PC), an electronic book terminal, a terminal for digital broadcasting, a personal digital assistant (PDA), a portable multimedia player (PMP), a Global Positioning System (GPS) device, an MP3 player, a digital camera, an Internet protocol television (IPTV), a digital TV (DTV), and consumer electronic devices and appliances (e.g., a refrigerator, an air-conditioner having a display, a thermostat, etc.). The electronic apparatus 1000 may be a wearable device to be worn on a target object (e.g., a human user). For example, the electronic apparatus 1000 may be a wristwatch, eye glasses, a ring, a bracelet, a necklace, or the like. Alternatively, the electronic apparatus 1000 may be an Internet of Things (IoT) apparatus including a bio-sensor.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The method of estimating performance of a bio-sensor is performed based on calculation of a quality score for which a correlation between visual features of an image and an authentication rate is considered, so that performance of the bio-sensor that obtains a bio-image for biometric authentication may be objectively and quantitatively estimated.

According to the authentication method and the electronic apparatus adopting the authentication method, a quality score with respect to an input bio-image may be calculated and a matching operation may be performed. Because the quality score has a high correlation with an authentication rate, the quality score may be applied to an image quality enhancing algorithm for increasing the rate of successful authentication.

While the method of estimating performance of a bio-sensor, the authentication method using a bio-image, and the electronic apparatus adopting the authentication method have been particularly described with reference to the accompanying drawings, it will be understood by those of ordinary skill in the art that various changes in form and details may be made therein without departing from the spirit and scope of the disclosure as defined by the appended claims. The example embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. A method of evaluating performance of a bio-sensor, the method comprising:
   obtaining an input bio-image by using the bio-sensor that is to be evaluated;
   obtaining a sample database comprising information of M reference bio-images, wherein M is a natural number and the reference bio-images are collected from a plurality of users;
   calculating a quality score of the input bio-image based on the input bio-image and the information in the sample database, by quantifying a plurality of preset features with respect to the sample database and the input bio-image, and quantifying differences therebetween;
   determining whether the input bio-image matches a registered image; and
   performing image processing for enhancing a quality of the input bio-image based on determining that the quality score is greater than or equal to a threshold value and based on determining that the input bio-image does not match the registered image.

2. The method of claim 1, wherein the calculating of the quality score comprises:
   defining a plurality of features (N features $f\_1, f\_2, \ldots, f\_N$, where N is an integer greater than 1) to be expressed as predetermined values;
   calculating first values ($Gf\_i\_j$ where i indicates integers from 1 to N, and j indicates integers from 1 to M), the first values indicating the plurality of features with respect to the sample database;
   calculating second values ($If\_i$, where i indicates an integer from 1 to N), the second values indicating the plurality of features with respect to the input bio-image; and
   quantifying differences between the first values ($Gf\_i\_j$) and the second values ($If\_i$) by using a preset formula.

3. The method of claim 2, wherein the defining of the plurality of features comprises:
   defining some of the plurality of features as $f\_i$ (where i indicates an integer from 1 to a) by applying a plurality of items (a items) for estimating an image to an entire target area of the image, wherein a is a natural number; and
   defining another some of the plurality of features as $f\_i'$ (where, i indicates an integer from a+1 to a+b*a) by applying the plurality of items to each of b areas into which the entire target area of the image is divided.

4. The method of claim 3, wherein the plurality of items comprise at least one of a mean of brightness, a standard deviation of brightness, roundness of a bright line, uniformity of brightness, and inhomogeneity of brightness.

5. The method of claim 2, wherein the quantifying comprises:
   calculating deviation values ($d\_i$), the deviation values indicating deviations of the second values ($If\_i$) with respect to the first values ($Gf\_i\_j$);

calculating scores (Fscore_i) of the plurality of features from the deviation values (d_i); and applying weights (w_i) to the scores (Fscore_i), respectively, and performing a summing operation by using Formula $\Sigma^{N}_{i=1}$(Fscore_i*w_i).

6. An authentication method comprising:
obtaining an input bio-image input to an electronic apparatus;
calculating a quality score of the input bio-image from the input bio-image and a sample database that comprises information of M reference bio-images stored in the electronic apparatus, wherein M is a natural number;
determining whether the quality score is greater than or equal to a threshold value;
performing a matching operation by determining whether the input bio-image matches a registered image stored in the electronic apparatus; and
performing image processing for enhancing a quality of the input bio-image based on determining that the quality score is greater than or equal to the threshold value and based on determining that the input bio-image does not match the registered image,
wherein the reference bio-images are collected from a plurality of users, and
the calculating includes quantifying a plurality of preset features with respect to the sample database and the input bio-image, and quantifying differences therebetween.

7. The authentication method of claim 6, wherein the calculating of the quality score comprises:
defining a plurality of features (N features f_1, f_2, ..., f_N, where N is an integer greater than 1) to be expressed as predetermined values;
calculating first values (Gf_i_j, where i indicates an integer from 1 to N, and j indicates an integer from 1 to M), the first values indicating the plurality of features with respect to the sample database;
calculating second values (If_i, where i indicates an integer from 1 to N), the second values indicating the plurality of features with respect to the input bio-image; and
quantifying differences between the first values (Gf_i_j) and the second values (If_i) by using a preset formula.

8. The authentication method of claim 7, wherein the defining of the plurality of features comprises:
defining some of the plurality of features as f_i (where, i indicates an integer from 1 to a) by applying a plurality of items (a items) for estimating an image to an entire target area of the image, and
defining another some of the plurality of features as f_i' (where, i' indicates an integer from a+1 to a+b*a) by applying the plurality of items to each of b areas into which the entire target area of the image is divided.

9. The authentication method of claim 8, wherein the plurality of items comprise at least one of a mean of brightness, a standard deviation of brightness, roundness of a bright line, uniformity of brightness, and inhomogeneity of brightness.

10. The authentication method of claim 7, wherein the quantifying comprises:
calculating deviation values (d_i), the deviation values indicating deviations of the second values (If_i) with respect to the first values (Gf_i_j);
calculating scores (Fscore_i) of the plurality of features from the deviation values (d_i); and
applying weights (w_i) to the scores (Fscore_i), respectively, and performing a summing operation by using Formula $\Sigma^{N}_{i=1}$(Fscore_i*w_i).

11. The authentication method of claim 10, further comprising:
in response to the quality score being greater than or equal to the threshold value, and the matching operation being determined as a matching failure, adjusting at least one of the weights.

12. The authentication method of claim 10, further comprising:
in response to the quality score being less than the threshold value, and the matching operation determined as a matching success, adjusting at least one of the weights.

13. The authentication method of claim 6, further comprising, in response to the quality score being less than the threshold value, performing the image processing for enhancing the quality of the input bio-image.

14. The authentication method of claim 6, further comprising displaying the input bio-image and the quality score on a display of the electronic apparatus.

15. An electronic apparatus comprising:
a bio-sensor configured to sense an input bio-image;
a memory configured to store a sample database, the sample database comprising information of M reference bio-images collected from a plurality of users, a registered bio-image of a user, and at least one program, wherein M is a natural number; and
a processor, by executing the at least one program, configured to:
calculate a quality score of the input bio-image from the sample database and the input bio-image, by quantifying a plurality of preset features with respect to the sample database and the input bio-image, and quantifying differences therebetween,
determine whether the quality score is greater than or equal to a threshold value,
determine whether the input bio-image matches the registered bio-image, and
perform image processing for enhancing a quality of the input bio-image based on determining that the quality score is greater than or equal to the threshold value and based on determining that the input bio-image does not match the registered bio-image.

16. The electronic apparatus of claim 15, further comprising a display configured to display the input bio-image and the quality score.

17. The electronic apparatus of claim 15, wherein the bio-sensor is one of a fingerprint recognition sensor, an iris recognition sensor, a blood vessel recognition sensor, and a face recognition sensor.

18. The electronic apparatus of claim 15, wherein the processor is further configured to, in response to the quality score being less than the threshold value, perform the image processing for enhancing the quality of the input bio-image.

19. The electronic apparatus of claim 15, wherein the processor is further configured to, in response to the quality score being greater than or equal to the threshold value and the processor determining that the input bio-image does not match the registered bio-image, store a result in the memory so as to feed the result back to the at least one program for calculating the quality score.

20. The electronic apparatus of claim 15, wherein the processor is further configured to, in response to the quality score being less than the threshold value and the processor determining that the input bio-image matches the registered bio-image, store a result in the memory so as to feed the result back to the at least one program for calculating the quality score.

21. An electronic apparatus comprising:
- a bio-sensor configured to sense an input bio-image;
- a memory configured to store a sample database, the sample database comprising information of M reference bio-images collected from a plurality of users, a registered bio-image of a user, and at least one program, wherein M is a natural number; and
- a processor, by executing the at least one program, configured to:
  - calculate a quality score of the input bio-image from the sample database and the input bio-image, by quantifying a plurality of preset features with respect to the sample database and the input bio-image, and quantifying differences therebetween using weights each related to the plurality of preset features;
  - determine whether the quality score is greater than or equal to a threshold value, and
  - determine whether the input bio-image matches the registered bio-image,
- wherein the weights are adjusted based on the quality score being greater than or equal to the threshold value, and the matching operation being determined as a matching failure, or
- wherein the weights are adjusted based on the quality score being less than the threshold value, and the matching operation determined as a matching success.

* * * * *